United States Patent

Mizusugi

[11] Patent Number: 5,368,625
[45] Date of Patent: Nov. 29, 1994

[54] CONVEYOR ROLL DEVICE FOR PRELIMINARILY BENDING SHEET GLASS

[75] Inventor: Tetsuya Mizusugi, Tokyo, Japan

[73] Assignee: Nippon Sheet Glass Co., Ltd., Japan

[21] Appl. No.: 14,129

[22] Filed: Feb. 5, 1993

[30] Foreign Application Priority Data

Feb. 6, 1992 [JP] Japan .................. 4-056168

[51] Int. Cl.⁵ .............................. C03B 23/02
[52] U.S. Cl. ........................ 65/273; 65/289; 65/106
[58] Field of Search ........... 65/106, 273, 289, 268, 65/104, 107; 198/826, 819

[56] References Cited

U.S. PATENT DOCUMENTS

| | | |
|---|---|---|
| 3,905,794 | 9/1975 | Revells et al. . |
| 4,557,341 | 12/1985 | Söderholm ............ 198/826 |
| 4,589,901 | 5/1986 | Yoshizawa et al. . |
| 4,723,983 | 2/1988 | Erdmann ............... 65/268 |
| 4,749,399 | 6/1988 | Yamada et al. . |
| 4,992,088 | 2/1991 | Sassanelli ............. 65/289 |
| 5,201,928 | 4/1993 | Dicks ................... 65/273 |
| 5,236,487 | 8/1993 | Letemps ............... 65/106 |
| 5,246,477 | 9/1993 | Kramer ................. 65/273 |

FOREIGN PATENT DOCUMENTS

| | | |
|---|---|---|
| 0143691 | 5/1985 | European Pat. Off. . |
| 0364415 | 4/1990 | European Pat. Off. . |
| 0436965 | 9/1991 | European Pat. Off. . |
| 2221409 | 11/1974 | France .................. 65/107 |
| 9300305 | 4/1993 | WIPO . |

Primary Examiner—W. Gary Jones
Assistant Examiner—John M. Hoffmann
Attorney, Agent, or Firm—Merchant, Gould, Smith, Edell, Welter & Schmidt

[57] ABSTRACT

A glass sheet that has been heated nearly to a softening point thereof is preliminarily bent by a conveyor roll device while being fed along a feed path to a bending press. The conveyor roll device has a succession of first straight rolls spaced along the feed path for supporting a central region of the glass sheet, and a succession of second straight rolls spaced along the feed path for supporting a marginal edge portion of the glass sheet. The second straight rolls are vertically tilted through progressively differing angles, respectively, along the feed path with respect to the first straight rolls. The first and second straight rolls alternate with each other along the feed path.

19 Claims, 10 Drawing Sheets

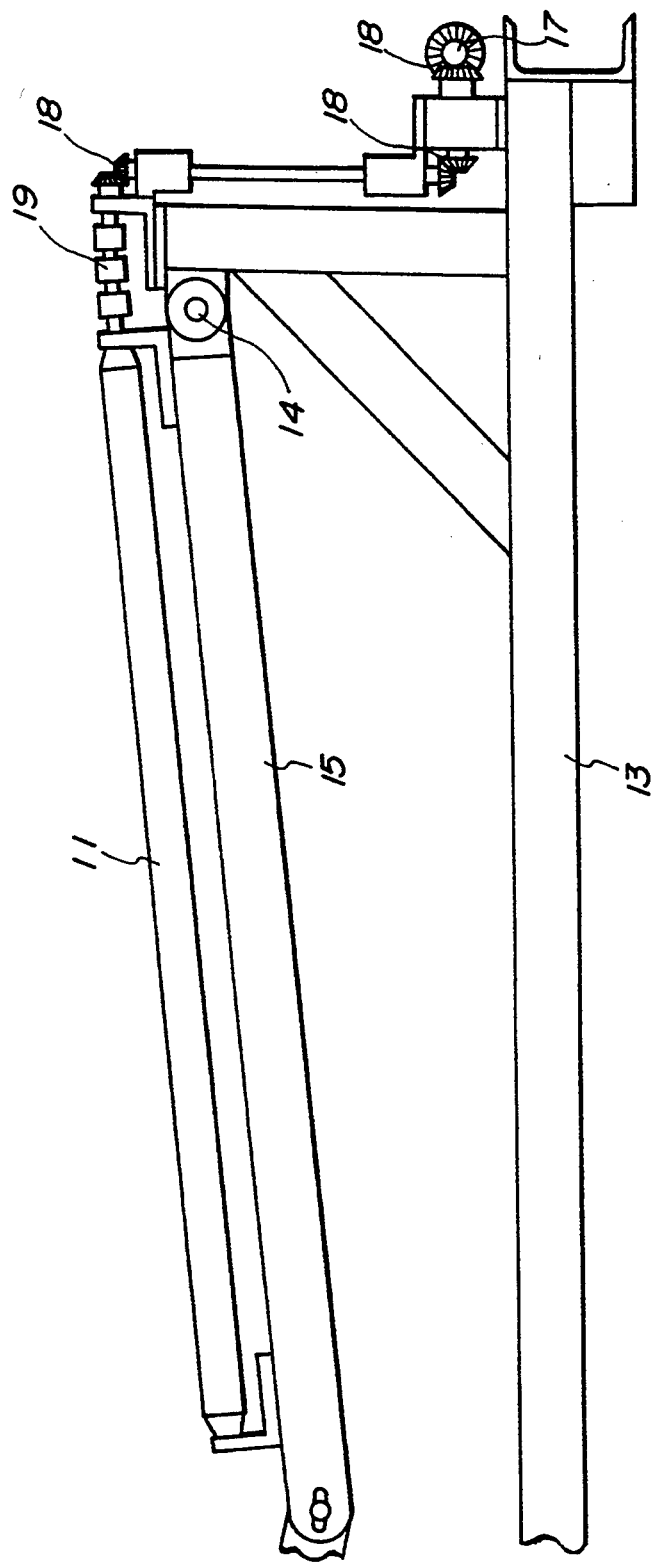

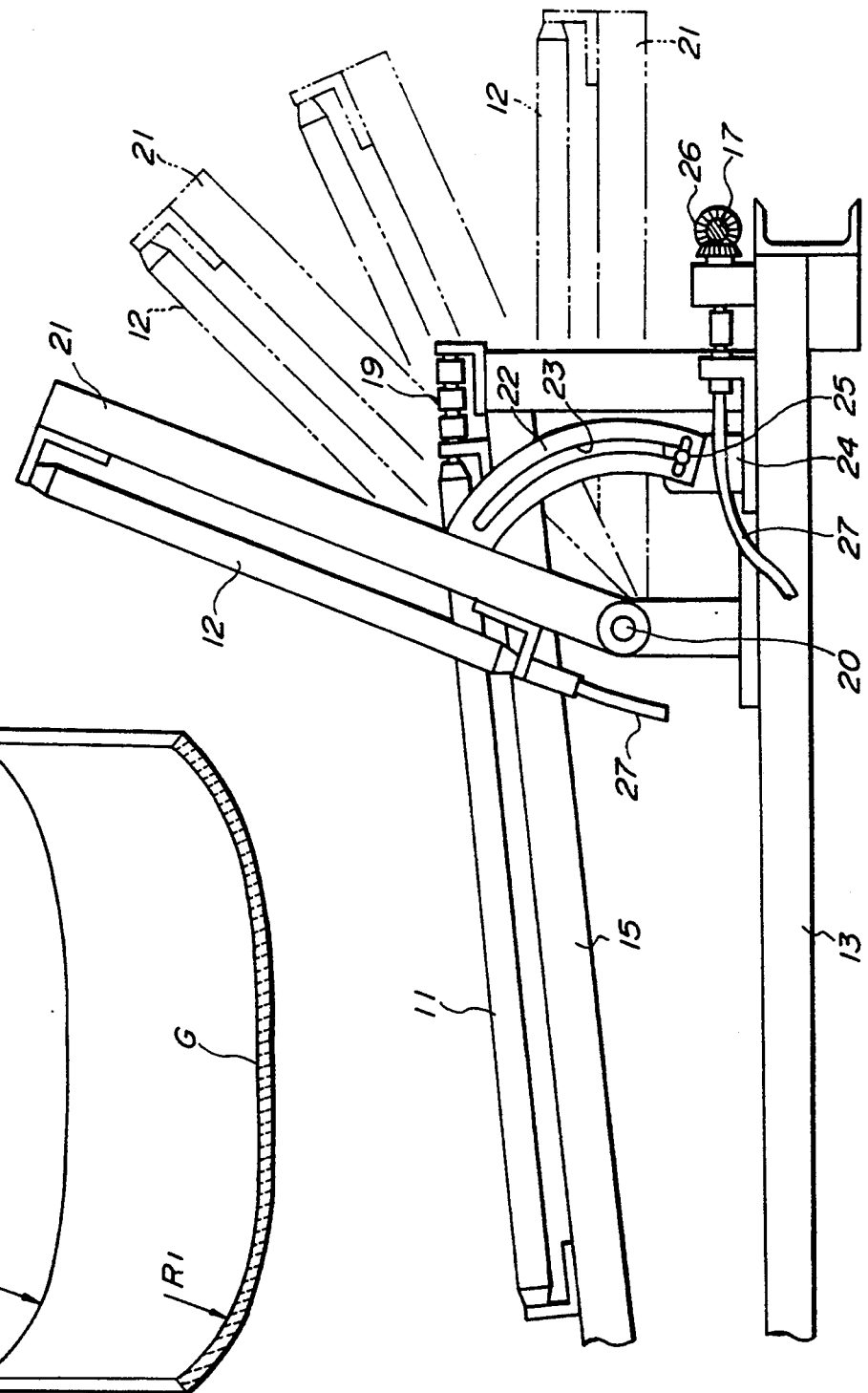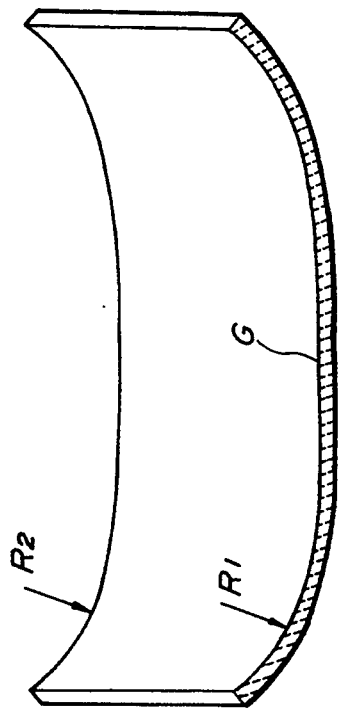

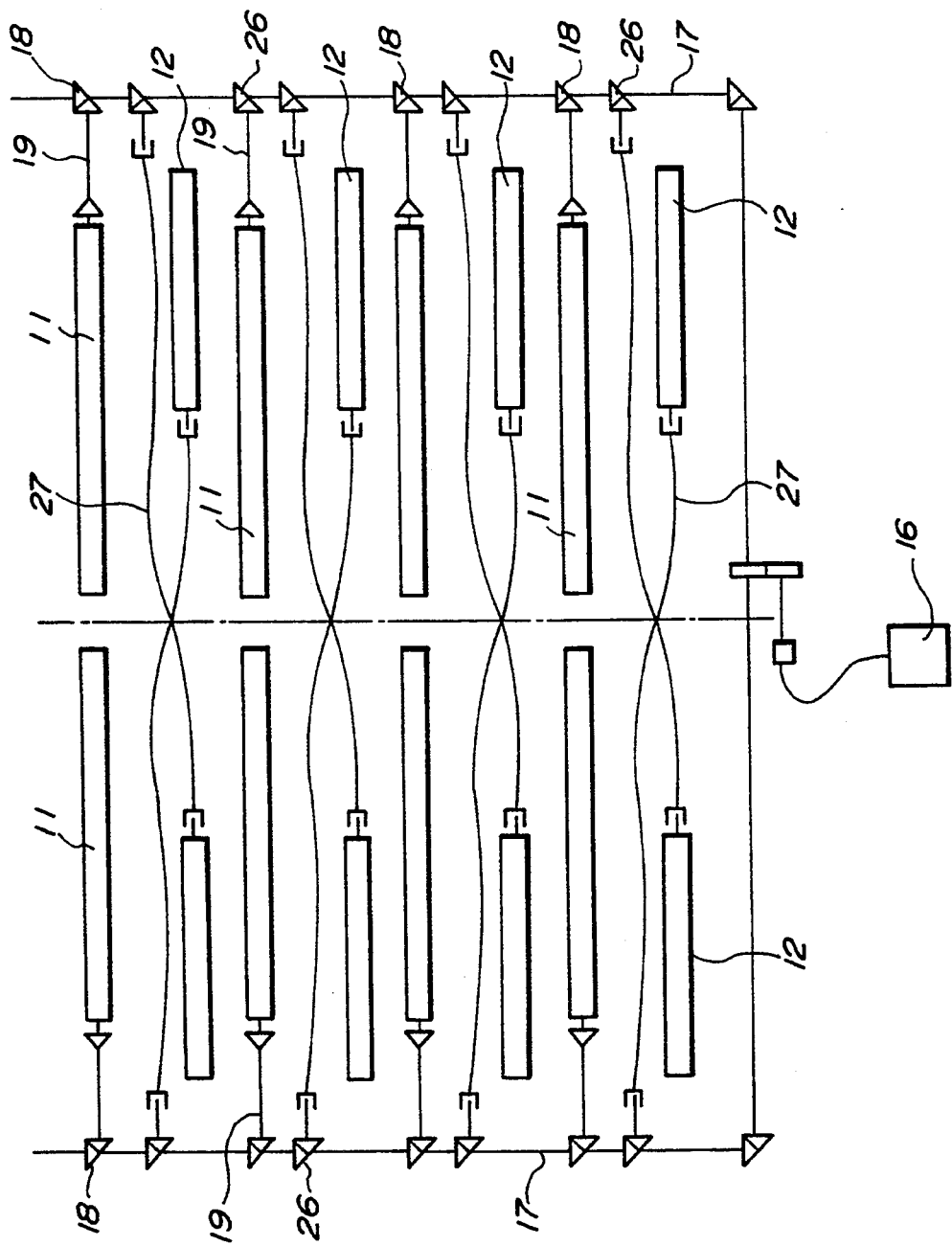

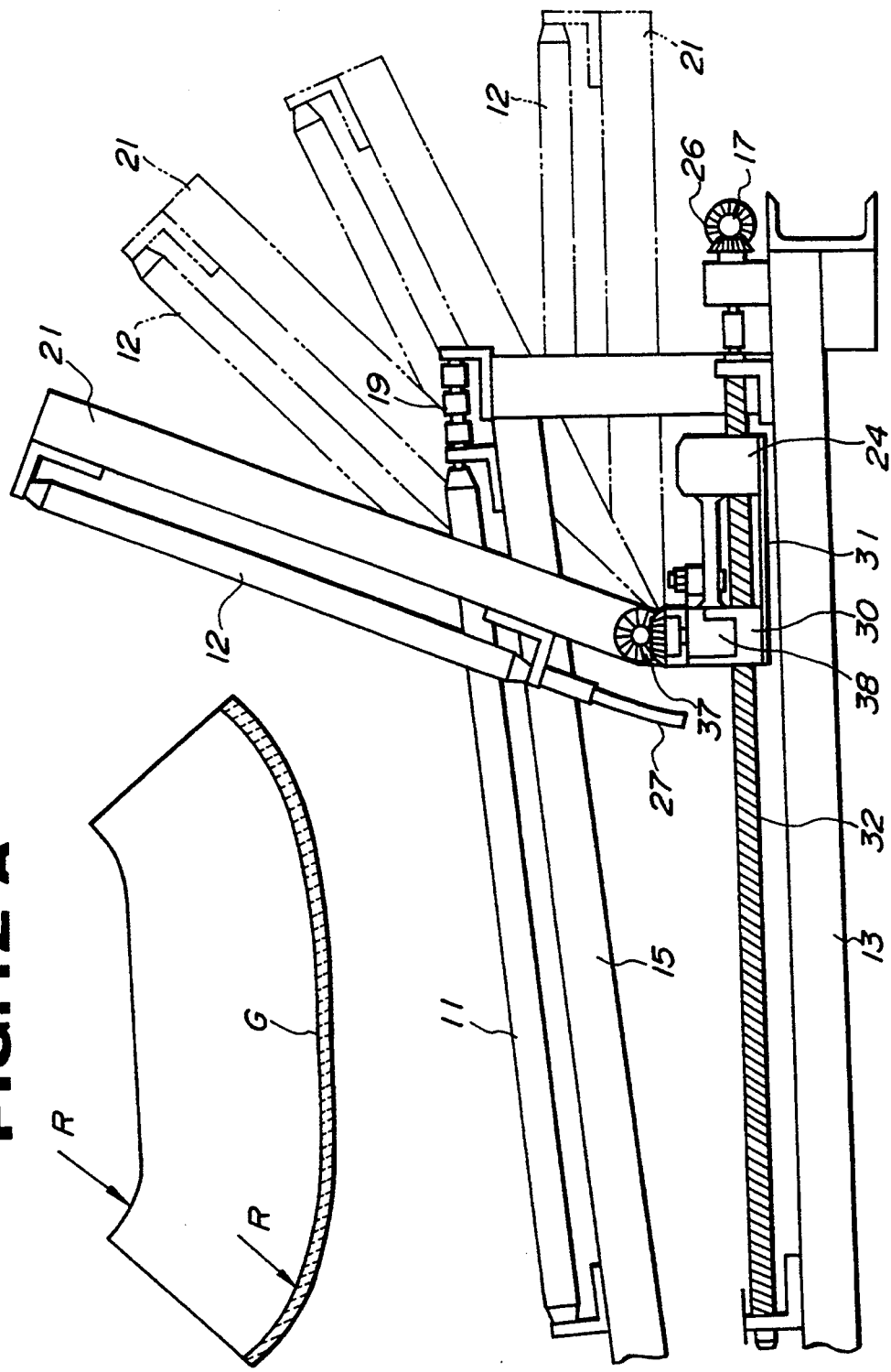

CONVEYOR ROLL DEVICE FOR PRELIMINARILY BENDING SHEET GLASS

BACKGROUND OF THE INVENTION

1. Field of the Invention

The present invention relates to a conveyor roll device that is positioned between a heating furnace and a bending press, for preliminarily bending a sheet of glass that has been heated by and fed from the heating furnace and which will be fed into and pressed to a bent shape by the bending press.

2. Description of the Prior Art

Bent glass sheets such as automobile window glass panels are produced by feeding a glass sheet heated by a heating furnace to a bending press having upper and lower press dies, between which the heated glass sheet is pressed to a desired bent shape. If, however, a flat glass sheet were pressed directly to a final bent shape, the bent glass sheet would tend to crack or would not be bent accurately to desired shape.

One solution to the above problem is disclosed in U.S. Pat. No. 4,749,399. According to the disclosed solution, the peripheral edge of a heated glass sheet fed from a heating furnace is supported on a separable ring mold, and after the peripheral edge of the glass sheet is preliminarily shaped by the ring mold, the glass sheet is pressed to a desired bent shape between upper and lower dies. If the glass sheet is to be bent to a relatively large curvature, only the peripheral edge of the heated glass sheet is supported by the ring mold for a relatively long period of time until the glass sheet is pressed by the upper and lower dies. Therefore, the heated glass sheet is liable to be undesirably deformed due to gravity before it is pressed to shape.

Japanese patent publication No. 55-49018 shows a succession of conveyor rolls for feeding a glass sheet from a heating furnace into a bending press. Each of the conveyor rolls comprises a curved core and a flexible sleeve rotatably fitted over the curved core. When the heated glass sheet is fed by the conveyor rolls, the glass sheet is preliminarily bent to a curved shape by the conveyor rolls. The conveyor rolls thus serve as bending rolls for preliminarily bending the glass sheet. The flexible sleeves are loosely fitted over the corresponding cores in order for the flexible sleeves to be able to rotate on the respective cores for feeding the glass sheet. Consequently, when the conveyor rolls feed the glass sheet, the flexible sleeves vibrate on rotation around the cores, straining the glass sheet to the point where some undesirable optical distortions may develop in the finally bent glass sheet. Another problem is that a different set of curved conveyor rolls must be used when glass sheets of a different curvature are to be produced.

SUMMARY OF THE INVENTION

It is therefore an object of the present invention to provide a conveyor roll device which can preliminarily bend a sheet of glass to an accurate shape without deformations and optical distortions.

According to the present invention, there is provided an apparatus for preliminarily bending a glass sheet heated nearly to a softening point thereof while feeding the glass sheet along a feed path to a bending press, the apparatus comprising a plurality of first straight rolls spaced along the feed path for supporting a central region of the glass sheet, and a plurality of second straight rolls spaced along the feed path for supporting a marginal edge portion of the glass sheet, and adjusting means for vertically tilting the second straight rolls with respect to the first straight rolls.

According to the present invention, there is also provided a conveyor roll device for feeding a glass sheet heated nearly to a softening point thereof along a feed path to a bending press, comprising roll means for supporting the glass sheet on a succession of first straight roll surfaces engaging a central region of the glass sheet and a succession of second straight roll surfaces engaging a marginal edge portion of the glass sheet, and adjusting means for tilting the second straight roll surfaces with respect to the first straight roll surfaces.

According to the present invention, there is also provided a glass bending apparatus comprising a press for bending a glass sheet, and a conveyor roll device for feeding the glass sheet which has been heated to a temperature near its softening point by a furnace along a direction to the press and for preliminarily bending the glass sheet prior to pressing of the glass sheet by the press, the conveyor roll device comprising a sequence of rolls which are rectilinear where they contact the glass sheet and arranged with their axes at differing angles of inclination to a horizontal plane so as to give the glass sheet a required prebend until the glass sheet is fed to the press.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 4 is a side elevational view of a first conveyor roll of the conveyor roll device according to the first embodiment;

FIG. 5 is a side elevational view of a second conveyor roll of the conveyor roll device according to the first embodiment;

FIG. 5A is a perspective view of a glass sheet that is preliminarily bent by the conveyor roll device shown in FIG. 5;

FIG. 6 is a plan view of a power transmitting system for the conveyor roll device according to the first embodiment;

FIG. 9A is a perspective view of a glass sheet that is preliminarily bent by the conveyor roll device shown in FIG. 9;

FIG. 12 is a side elevational view of a conveyor roll device according to a fourth embodiment of the present invention; and FIG. 12A is a perspective view of a glass sheet that is preliminarily bent by the conveyor roll device shown in FIG. 12.

DETAILED DESCRIPTION OF THE PREFERRED EMBODIMENTS

Figure 1:
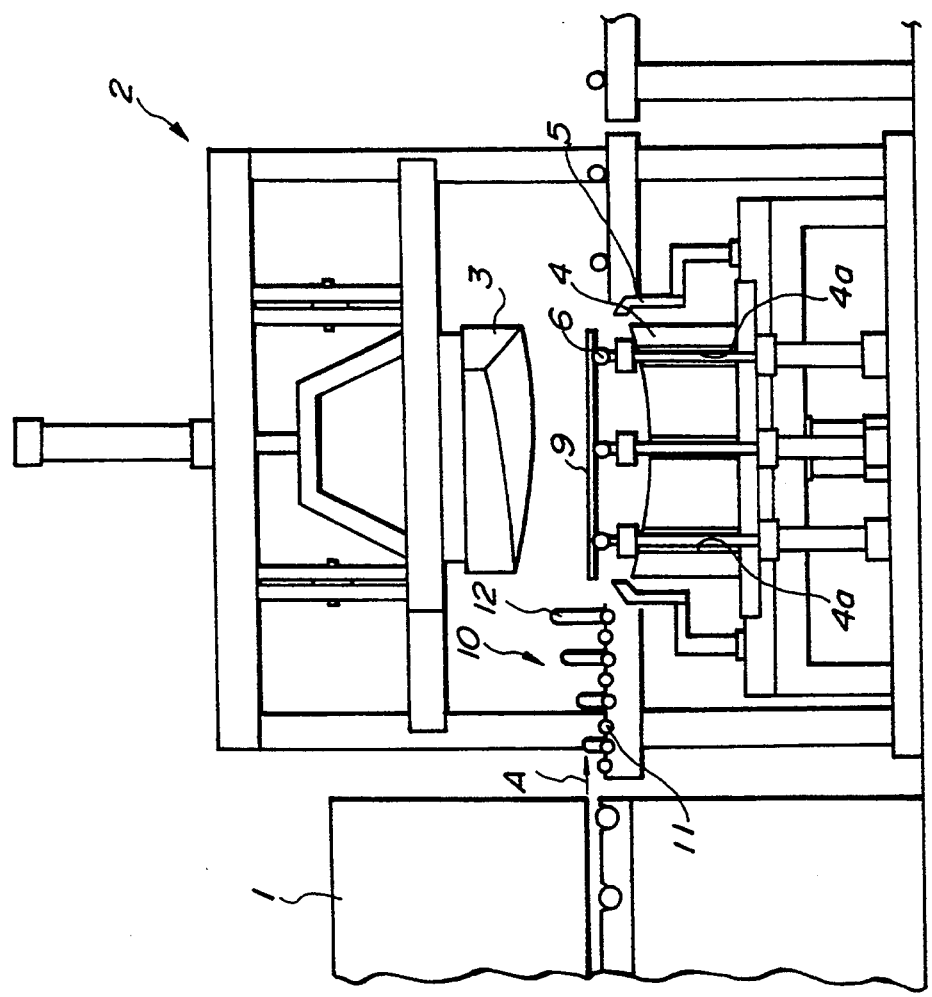
FIG. 1 is a front elevational view of a glass sheet bending system including a conveyor roll device according to an embodiment of the present invention which is disposed between a heating furnace and a bending press.

As shown in FIG. 1, a glass sheet bending system includes a conveyor roll device 10 according to an embodiment of the present invention for preliminarily bending a glass sheet.

The glass sheet bending system also has a heating furnace 1 for heating a glass sheet nearly to its softening point and a bending press 2 for pressing the heated glass sheet to a desired bend shape.

The bending press 2 is positioned downstream of the heating furnace 1 with respect to the direction in which the heated glass sheet is fed from the heating furnace 1 along a feed path A. The bending press 2 comprises a vertically movable upper die 3, a vertically movable lower die 4 disposed below the upper die 3, a vertically movable concave ring mold 5 extending around the lower die 4 for supporting the peripheral edge of a glass sheet G, and a plurality of transfer rolls 6 vertically movably located in the ring mold 5 for supporting the glass sheet G that has been preliminarily bent by the conveyor roll device 10.

The transfer rolls 6 are composed of inner rolls 6a and outer rolls 6b (see FIG. 2) that are arranged to provide an upper support surface complementary in shape to the preliminarily bent glass sheet G. The heated glass sheet G discharged from the heating furnace 1 is fed by the conveyor roll device 10 onto the transfer rolls 6. Then, the peripheral edge of the glass sheet G is supported by the ring mold 5, after which the glass sheet G is pressed to shape between the upper and lower dies 3, 4.

The conveyor roll device 10 will be described in detail below with reference to FIGS. 2 through 6.

The conveyor roll device 10 has a pair of left and right conveyor roll assemblies disposed one on each side of the central axis B of the feed path A. Since the left and right conveyor roll assemblies are symmetrical in configuration, only one of the left and right conveyor roll assemblies will be described below with reference to FIGS. 2 through 5.

Figure 2:
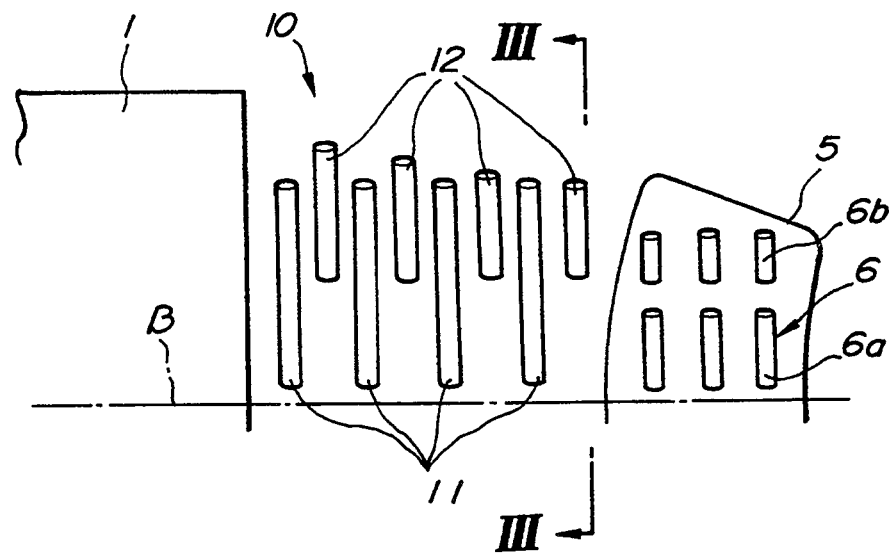
FIG. 2 is a schematic plan view of the conveyor roll device according to the first embodiment.
Figure 3:
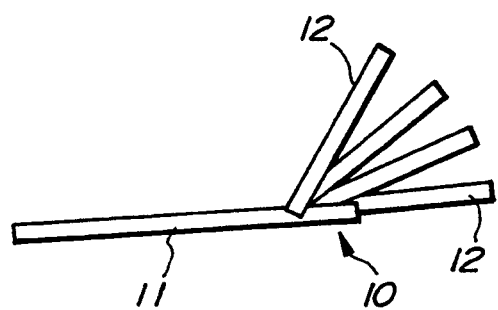
FIG. 3 is a side elevational view taken along line III—III of FIG. 2.

As shown in FIG. 2, the conveyor roll assembly comprises a plurality of first spaced straight conveyor rolls 11 extending perpendicularly to the feed path A and a plurality of second spaced straight conveyor rolls 12 also extending perpendicularly to the feed path A. The first and second conveyor rolls 11, 12 alternate with each other along the feed path A. As shown in FIGS. 2 and 3, the second conveyor rolls 12 are tilted about their inner ends that are closer to the center of the feed path A, successively through differing angles with respect to a horizontal plane. More specifically, the second conveyor rolls 12 are tilted through progressively greater angles in the direction away from the heating furnace 1.

As shown in FIG. 4, each of the first conveyor rolls 11 is rotatably mounted on an arm 15 that is supported on a frame 13 for angular adjustment about a shaft 14 on the outer end of the first conveyor roll 11 with respect to the frame 13. Rotation of a main shaft 17 that is rotated by a motor 16 (see FIG. 6) is transmitted to each of the first conveyor rolls 11 through successive bevel gears 18 and a universal joint 19.

As shown in FIG. 5, each of the second conveyor rolls 12 is rotatably mounted on an arm 21 that is supported on the frame 13 for angular adjustment about a shaft 20 on the inner end of the second conveyor roll 12 with respect to the frame 13. A vertical arcuate guide plate 22 having an arcuate guide groove 23 defined therein is attached to an outer edge of the arm 21. The frame 13 supports a bracket 24 with a setscrew 25 supported thereon which extends through the arcuate guide groove 23. When the setscrew 25 is loosened, the arm 21 and hence the second conveyor roll 12 can be angularly adjusted with respect to the frame 13. When the setscrew 25 is tightened, the arm 21 and the second conveyor roll 12 are fixed at a desired angle with respect to the frame 13. Rotation of the main shaft 17 rotated by the motor 16 is transmitted to the second conveyor roll 12 through bevel gears 26 and a flexible shaft 27. Actually, as shown in FIG. 6, the rotation of the main shaft 17 of the right conveyor roll assembly is transmitted through the bevel gears 26 and the flexible shafts 27 to the second conveyor rolls 12 of the left conveyor roll assembly, and the rotation of the main shaft 17 of the left conveyor roll assembly is transmitted through the bevel gears 26 and the flexible shafts 27 to the second conveyor rolls 12 of the right conveyor roll assembly. In this manner, the flexible shafts 27 are not required to be sharply bent in transmitting the rotation to the second conveyor rolls 12.

The glass sheet G that has been heated by the heating furnace 1 is preliminarily bent by the conveyor roll device 10 as follows:

The first conveyor rolls 11 are held substantially horizontally, and the second conveyor rolls 12 are tilted successively through progressively greater angles in the direction away from the heating furnace 1. Thus, the second conveyor roll 12 closest to the heating furnace 1 is tilted through the smallest angle, and the second conveyor roll 12 closest to the bending press 2 is tilted through the greatest angle.

Figure 7:
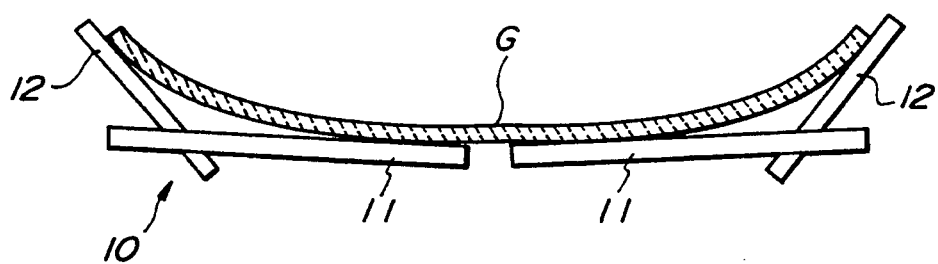
FIG. 7 is a side elevational view showing the manner in which a glass sheet is preliminarily bent by the conveyor roll device according to the first embodiment.

The heated glass sheet G discharged from the heating furnace 1 is then fed by the conveyor roll device 10. As the heated glass sheet G travels on the first and second conveyor rolls 11, 12, it is progressively preliminarily shaped thereby as shown in FIG. 7. More specifically, opposite marginal edge portions of the glass sheet G are bent upwardly through progressively greater angles by the second conveyor rolls 12 of the left and right conveyor roll assemblies. The glass sheet G that has been preliminarily bent by the conveyor roll device 10 is then delivered onto the transfer rolls 6.

Figure 8:
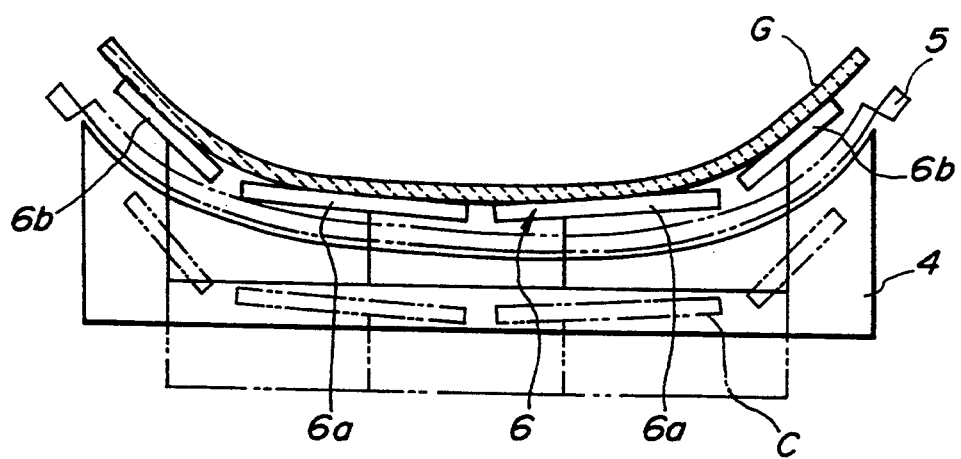
FIG. 8 is a side elevational view showing the manner in which the glass sheet is transferred to transfer rolls.

As shown in FIG. 8, the outer rolls 6b of the transfer rolls 6 are tilted upwardly with respect to the inner rolls 6a thereof so that they jointly provide an upper support surface for snugly supporting the glass sheet G in a manner to keep the preliminarily bent configuration thereof.

After the glass sheet G has been placed on the transfer rolls 6, the transfer rolls 6 are lowered to an imaginary-line position C (FIG. 8), transferring the glass sheet G onto the ring mold 6. At this time, the transfer rolls 6 are retracted in recesses 4a (see FIG. 1) defined in the lower die 4. Thereafter, the upper die 3 is lowered, and the lower die 4 and the ring mold 5 are lifted for pressing the glass sheet G to a desired final bent shape.

The conveyor roll device 10 is suitable for preliminarily bending rectangular glass sheets into a shape whose opposite marginal edges are bent with a uniform radius of curvature (i.e., $R_1 = R_2$ in FIG. 5A).

The first conveyor rolls 11 may not be angularly adjustable, but may be fixed in a completely horizontal direction. In this case, the first conveyor rolls 11 of the left and right conveyor roll assemblies may be joined together.

Since the second conveyor rolls 12 are independently tiltable through desired angles, the conveyor roll device 10 can be adjusted to preliminarily bend a glass sheet G highly accurately to a desired curved shape. As the first and second conveyor rolls 11, 12 support the underside of the glass sheet G without vibrations, the glass sheet G is substantially free from deformations and optical distortions after it is preliminarily bent. The conveyor roll device 10 is also capable of adjusting the speed at which a glass sheet G is preliminarily bent, by altering the angles of the second conveyor rolls 12.

Figure 9:
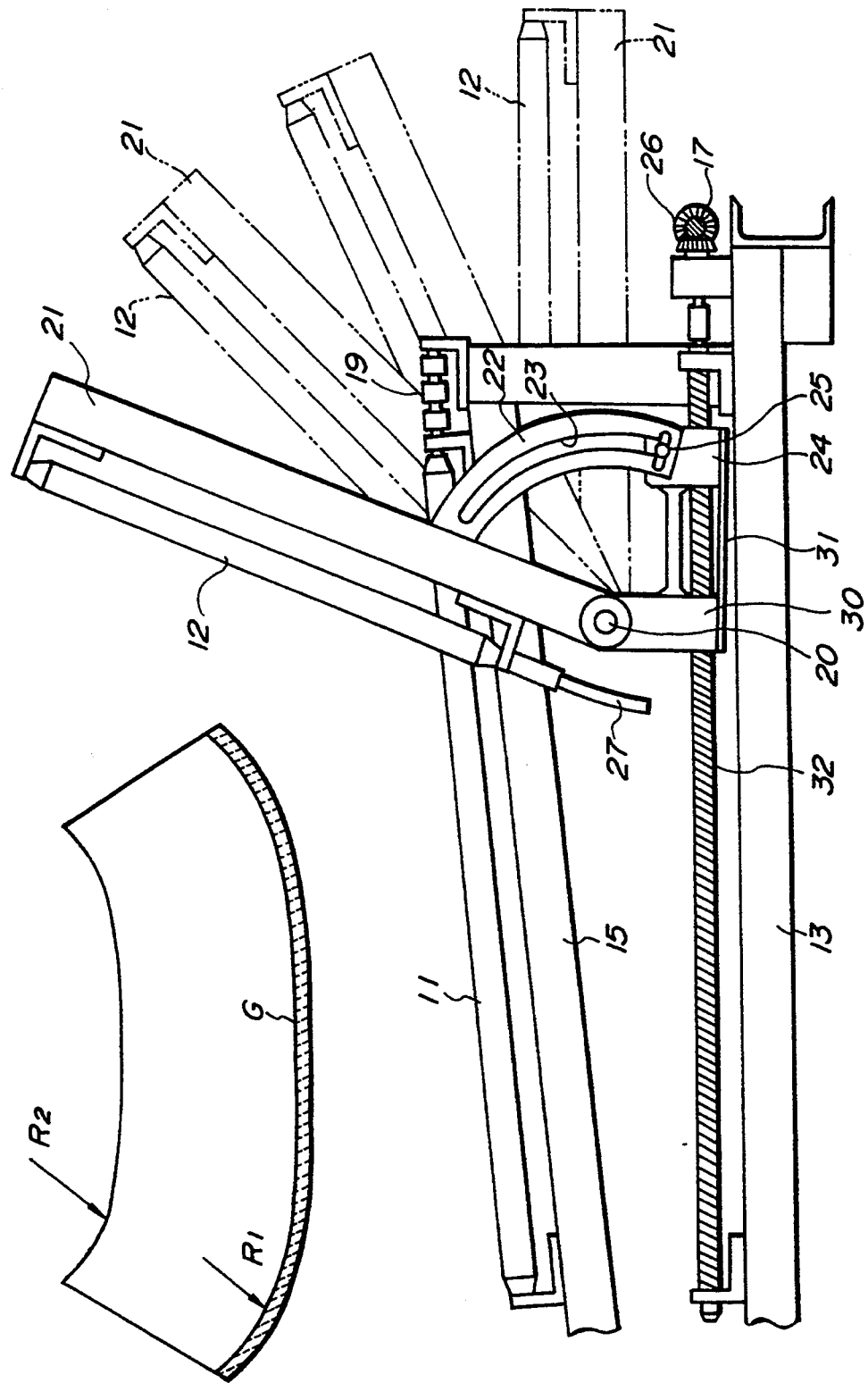
FIG. 9 is a side elevational view of a conveyor roll device according to a second embodiment of the present invention.

FIG. 9 shows a conveyor roll device according to another embodiment of the present invention.

Figure 10:
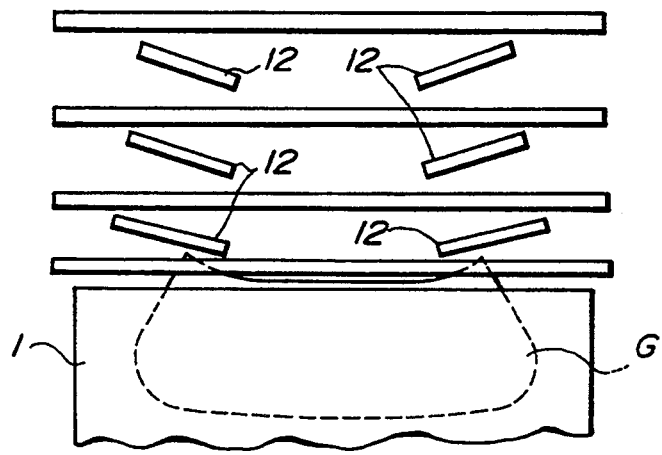
FIGS. 10A through 10C are schematic plan views showing the manner in which the conveyor roll device shown in FIG. 9 operates to preliminary bend a glass sheet.
Figure 10:
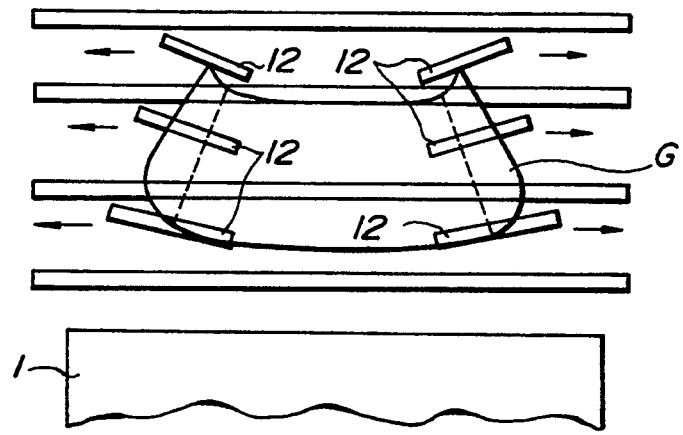
Figure 10:
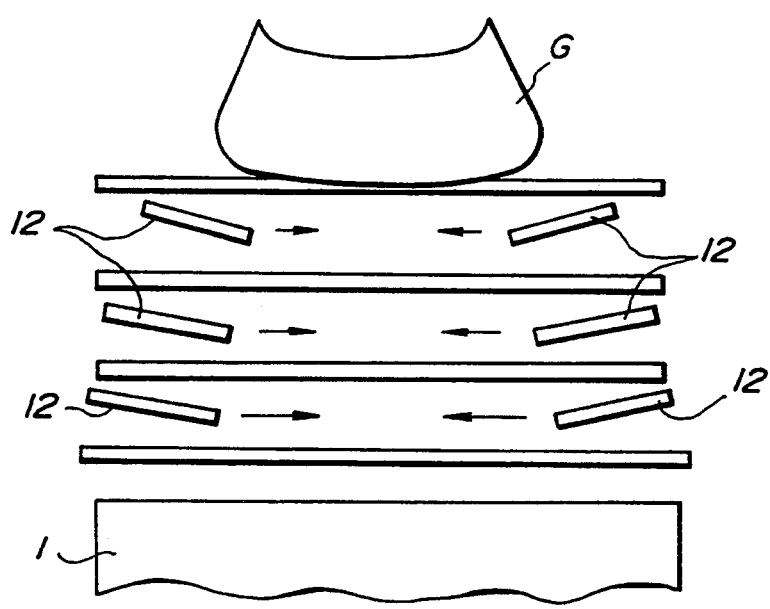

The conveyor roll device shown in FIG. 9 differs from the conveyor roll device shown in FIG. 5 in that each of the second conveyor rolls 12 is rectilinearly movable perpendicularly toward and away from the central axis B of the feed path A. As shown in FIG. 9, the arm 21 is angularly movably mounted on a bracket 30 that is connected to the bracket 24 by a horizontal plate 31. The bracket 24 is not connected to the frame 13. The brackets 30, 24 have respective lead screw nuts threaded over a horizontal lead screw 32 rotatably mounted on the frame 13. The horizontal lead screw 32 extends perpendicularly to the central axis B of the feed path A. The horizontal lead screw 32 has an outer end connected to the main shaft 17 through bevel gears 26. When a glass sheet G is fed by the conveyor roll device, the second conveyor rolls 12 are synchronously moved perpendicularly to the feed path A by the lead screw 32. Specifically, before the glass sheet G is fed by the conveyor roll device, the second conveyor rolls 12 are positioned in an inner position as shown in FIG. 10A. When the glass sheet G is fed by the conveyor roll device, the second conveyor rolls 12 of the left and right conveyor roll assemblies move away from each other as shown in FIG. 10B. After the glass sheet G enters the bending press, the second conveyor rolls 12 return to the inner position as shown in FIG. 10C.

The conveyor roll device shown in FIG. 9 is suitable for preliminarily bending trapezoidal glass sheets into a shape whose opposite marginal edges are bent with a uniform radius of curvature (i.e., $R_1 = R_2$ in FIG. 9A).

The lead screws 32 may be connected to a different motor so that they may be rotated independently of the motor 16 which rotates the second conveyor rolls 12. Therefore, the lead screws 32 may be used to adjust the position of the second conveyor rolls 12 with respect to, or the distance thereof from, the central axis B of the feed path A, rather than moving them in synchronism with the feeding of the glass sheet G. The conveyor roll device with the lead screws 32 used to adjust the position of the second conveyor rolls 12 is suitable for preliminarily bending rectangular glass sheets of different sizes into a shape whose opposite marginal edges are bent with a uniform radius of curvature.

Figure 11:
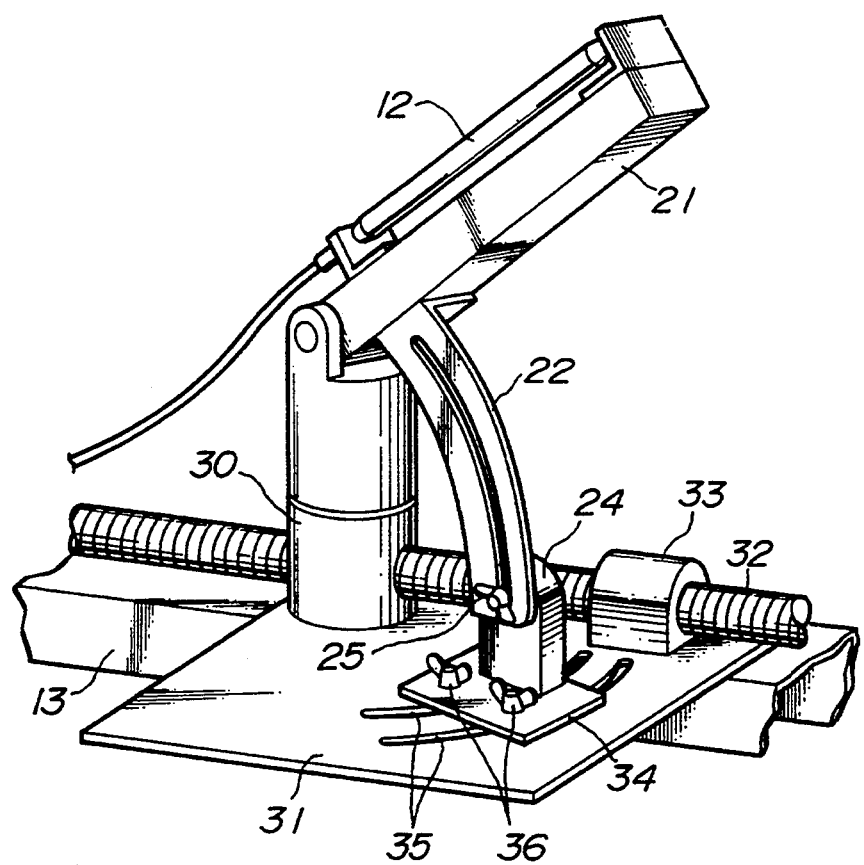
FIG. 11 is a fragmentary perspective view of a conveyor roll device according to a third embodiment of the present invention.

FIG. 11 shows a conveyor roll device according to still another embodiment of the present invention. In FIG. 11, the arm 21 is angularly movably mounted on the bracket 30, and the lead screw 32 is threaded through the lead screw nut in the bracket 30 and a lead screw nut 33 on the plate 31. The bracket 24 is mounted on a base 34 movably disposed on the horizontal plate 31. The horizontal plate 31 has a pair of parallel arcuate guide grooves 35 defined therein, and the base 34 is positionally adjustably fastened to the horizontal plate 31 by setscrews 36 that extend through the guide grooves 35. The arcuate guide grooves 35 extend about the vertical axis of the bracket 30 around which the arm 21 can be turned. Therefore, when the setscrews 36 are loosened, the arm 21 and hence the conveyor roll 12 can be angularly moved about the vertical axis of the bracket 30, i.e., the angle between the central axis B of the feed path A and the vertical plane in which the conveyor roll 12 is tiltable can be varied. When the setscrews 36 are tightened, the vertical plane in which the conveyor roll 12 is tiltable is angularly fixed with respect to the central axis B of the feed path A.

FIG. 12 shows a conveyor roll device according to yet another embodiment of the present invention. The conveyor roll device shown in FIG. 12 differs from the conveyor roll device shown in FIG. 9 in that the arm 21 is angularly movable about its inner end in synchronism with the feeding of the glass sheet G. More specifically, the arm 21 is operatively coupled to the motor 16 through bevel gears 37, a worm gear mechanism 38, and the lead screw 32. One of the bevel gears 37 is fixed to the inner end of the arm 21, and the other bevel gear 37 meshing therewith is coupled to the worm gear mechanism 38 that is mounted on the bracket 30. The worm gear mechanism 38 is operatively connected to the lead screw 32. Therefore, when the glass sheet G is fed by the conveyor roll device, the second conveyor rolls 12 are moved away from the central axis B of the feed path A by the lead screws 32, and at the same time are tilted, i.e., vertically angularly moved with respect to the first conveyor rolls 12.

The conveyor roll device shown in FIG. 12 is suitable for preliminarily bending trapezoidal glass sheets into a shape whose opposite marginal edges are bent with different radii of curvature (i.e., $R_1 \neq R_2$ in FIG. 12A).

In FIG. 1, the bending press 2 is positioned outside of the heating furnace 1. However, the principles of the present invention are also applicable to a glass sheet bending system in which a bending press is positioned within a heating furnace.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. An apparatus for preliminarily bending a glass sheet heated nearly to a softening point thereof by a heating furnace while the glass sheet is fed relative to a central axis in a feed path direction from the heating furnace to a bending press, said glass sheet having a central portion and a marginal edge portion, the apparatus comprising:

a plurality of spaced-apart first straight rolls for supporting the central region of the glass sheet; and a plurality of spaced-apart second straight rolls for supporting the marginal edge portion of the glass sheet, said second straight rolls having first ends closer to the central axis and second ends farther from the central axis;

means for moving the second straight rolls including the first and second ends toward and away from the central axis; and means for vertically tilting the second straight rolls through progressively differing angles, respectively, along the feed path direction with respect to the first straight rolls.

2. An apparatus according to claim 1, wherein said first and second straight rolls are alternately located with respect to each other.

3. An apparatus according to claim 1 wherein said tilting means includes means for adjusting said second straight rolls about the first ends thereof.

4. An apparatus according to claim 1, wherein said tilting means comprises means for progressively adjusting angles of said second straight rolls along the feed path direction.

5. An apparatus according to claim 1, wherein said tilting means comprises means for adjusting angles of said second straight rolls independently of each other with respect to said first straight rolls.

6. An apparatus according to claim 1, further comprising drive means for rotating said first and second straight rolls about their own axes to feed the glass sheet along the feed path direction.

7. An apparatus according to claim 6, wherein said tilting means comprises means for automatically adjusting angles of said second straight rolls with respect to said first straight rolls in synchronism with the rotation by said drive means of said first and second straight rolls.

8. An apparatus according to claim 1, wherein said tilting means comprises means for automatically adjusting angles of said second straight rolls with respect to said first straight rolls in synchronism with the movement by said moving means of said second straight rolls.

9. An apparatus according to claim 1, wherein said first straight rolls have first ends closer to the central axis and second ends farther from the central axis, said tilting means including means for inclining said first straight rolls about the second ends thereof.

10. An apparatus according to claim 1, further comprising means for angularly canting said second conveyor rolls horizontally with respect to the central axis.

11. A conveyor roll device for moving a glass sheet heated nearly to a softening point thereof relative to a central axis in a feed path direction, said glass sheet having a central portion and a marginal edge portion, said device comprising:

left and right roll assemblies disposed on first and second sides of the central axis, respectively, said left and right roll assemblies for supporting the glass sheet on a succession of first straight roll surfaces engaging the central region of the glass sheet and a succession of second straight roll surfaces engaging the marginal edge portion of the glass sheet on the first and second sides of the central axis, respectively;

said left roll assembly including first means for tilting said second straight roll surfaces through progressively differing angles, respectively, along the feed path, on the first side of the central axis in a first direction with respect to said first straight roll surfaces, said right roll assembly including second means for tilting said second straight roll surfaces through progressively differing angles, respectively, along the feed path, on the second side of the central axis in a second direction with respect to said first straight roll surfaces.

12. A conveyor roll device according to claim 11, wherein on each of the first and second sides, said first straight roll surfaces alternate with said second straight roll surfaces along the feed path direction.

13. A conveyor roll device according to claim 11, wherein each of said first and second tilting means comprises means for progressively adjusting angles of said second straight roll surfaces along the feed path direction.

14. A conveyor roll device according to claim 11, wherein each of said first and second tilting means comprises means for adjusting angles of said second straight roll surfaces independently of each other with respect to said second straight roll surfaces.

15. A conveyor roll device according to claim 11, further comprising first and second drive means for rotating said first and second straight roll surfaces to feed the glass sheet along the feed path direction on the first and second sides of the central axis, respectively.

16. A conveyor roll device according to claim 15, wherein said first and second tilting means each comprises means for automatically adjusting angles of said second straight roll surfaces with respect to said first straight roll surfaces in synchronism with the rotation by said first and second drive means of said first and second straight roll surfaces, respectively.

17. A conveyor roll device according to claim 11, wherein said left and right roll assemblies further comprise first and second means for moving said second straight roll surfaces on the first and second sides of the central axis toward and away from the central axis, respectively.

18. A conveyor roll device according to claim 17, wherein said first and second tilting means each comprises means for automatically adjusting angles of said second straight roll surfaces with respect to said first straight roll surfaces in synchronism on the first and second sides of the central axis with the movement by said first and second moving means of said second straight roll surfaces, respectively.

19. A conveyor roll device according to claim 11, further comprising:

first and second drive means for rotating said first and second straight roll surfaces to feed the glass sheet along the feed path direction on the first and second sides of the central axis, respectively; and first and second means for moving said second straight roll surfaces on the first and second sides of the central axis toward and away from the central axis, respectively;

said first and second tilting means comprising means for automatically adjusting angles of said second straight roll surfaces with respect to said first straight roll surfaces in synchronism on the first and second sides of the central axis with the rotation by said first and second drive means of said first and second straight roll surfaces on the first and second sides of the central axis and the movement by said first and second moving means of said second straight roll surfaces on the first and second sides of the central axis.

* * * * *